(12) United States Patent
Hiraguchi

(10) Patent No.: US 7,011,263 B2
(45) Date of Patent: Mar. 14, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/465,627

(22) Filed: Jun. 20, 2003

(65) Prior Publication Data

US 2003/0234309 A1 Dec. 25, 2003

(30) Foreign Application Priority Data

Jun. 25, 2002 (JP) ............................. 2002-184085

(51) Int. Cl.
*G11B 23/107* (2006.01)
(52) U.S. Cl. .................... 242/348.2; 360/132
(58) Field of Classification Search ................ 242/348, 242/348.2; 360/132
See application file for complete search history.

(56) References Cited

U.S. PATENT DOCUMENTS

| | | | |
|---|---|---|---|
| 3,861,611 A | 1/1975 | Esashi et al. | |
| 5,706,146 A | 1/1998 | Ono et al. | |
| 6,349,892 B1 * | 2/2002 | Morita et al. | 242/347.1 |
| 6,435,439 B1 | 8/2002 | Ishihara et al. | |
| 6,581,865 B1 | 6/2003 | Zweighaft et al. | |
| 6,764,037 B1 | 7/2004 | Hancock et al. | |
| 2003/0080228 A1 | 5/2003 | Hiraguchi et al. | |
| 2003/0094528 A1 | 5/2003 | Hiraguchi | |
| 2003/0094530 A1 | 5/2003 | Hiraguchi | |
| 2003/0178519 A1 | 9/2003 | Hancock et al. | |
| 2003/0234308 A1 | 12/2003 | Hiraguchi | |
| 2004/0011909 A1 * | 1/2004 | Ishihara | 242/348.2 |
| 2004/0041053 A1 | 3/2004 | Iino | |
| 2004/0050991 A1 | 3/2004 | Hiraguchi | |
| 2004/0061016 A1 * | 4/2004 | Morita et al. | 242/348 |
| 2004/0061017 A1 | 4/2004 | Hiraguchi | |
| 2004/0089757 A1 | 5/2004 | Ishihara | |

FOREIGN PATENT DOCUMENTS

| | | |
|---|---|---|
| JP | 2000-076821 A | 3/2000 |
| JP | 2001-148179 A | 5/2001 |

* cited by examiner

*Primary Examiner*—John Q. Nguyen
(74) *Attorney, Agent, or Firm*—Sughrue Mion, PLLC

(57) ABSTRACT

A recording tape cartridge has a case which is substantially rectangular, and which rotatably accommodates a single reel on which a recording tape is wound; an opening formed at a corner portion of the case at a side of loading the case into a drive device, the opening being for pulling-out of a leader member attached to an end portion of the recording tape; and a shielding member sliding so as to open and close the opening. A dustproofing wall, which overlaps with a distal end of the shielding member when the shielding member closes the opening, is formed at a peripheral edge of the opening.

20 Claims, 7 Drawing Sheets

RECORDING TAPE CARTRIDGE

BACKGROUND OF THE INVENTION

1. Field of the Invention

The present invention relates to a recording tape cartridge. The recording tape cartridge accommodates a single reel around which a recording tape, such as a magnetic tape, primarily used as a recording/playback medium for a computer or the like.

2. Description of the Related Art

Conventionally, there is known a magnetic tape cartridge constructed such that a magnetic tape used as a data recording/playback medium for a computer or the like is wound on a single reel, and the reel is accommodated in an accommodating case. A leader member, such as a leader pin, a leader tape, or a leader block, is provided to the end of the magnetic tape. The leader member is pulled out from an opening of the magnetic tape cartridge by using pull-out means provided in a drive device, and the magnetic tape fixed to the leader member is wound around a take-up reel in the drive device.

A reel gear is formed annular in the center of the reel lower surface appearing from an opening formed on a lower surface of the magnetic tape cartridge, a drive gear provided on a rotation shaft in the drive device is engaged with the reel gear, and the reel is thereby rotationally driven. Therefore, data can be recorded on the magnetic tape, or data recorded on the magnetic tape can be played back in such a manner that the reel of the magnetic tape cartridge and the take-up reel of the drive device are rotated in synchronization.

Magnetic tape cartridges of the above-described type are characterized in that the accommodating space for preservation can be small, and a large amount of information can be recorded. The position of the opening and the type of a door for opening and closing an opening are different depending on the type of the leader member. More specifically, as shown in FIG. 7, with a leader pin 70, an opening 68 is formed on a sidewall 64 of an accommodating case formed parallel to the direction of insertion to the drive device (direction of an arrow P). In this case, a door 66 slidably moves in the same direction as the direction of insertion to thereby open and close the opening 68.

This type of door 66 is assembled into the case 60 by a coil spring 67 being placed on a shaft 65 projecting from a rear end portion of the door 66, and the rear end portion of the coil spring 67 being anchored on an anchor portion 63 provided at the case 60. An engagement portion 69, which is engaged by an unillustrated opening/closing member provided at the drive device, projects outwardly at the front end portion of the door 66.

Accordingly, when the magnetic tape cartridge is loaded into a drive device, the opening/closing member engages the engagement portion 69, the door 66 is pushed relatively rearward against the urging force of the coil spring 67, and the opening 68 is opened. At this time, a cut-out portion 61 for exposing the engagement portion 69 is formed at a side wall 62 side which faces the drive device and at an end portion at the opening 68 side, so that the opening/closing member can suitably engage with the engagement portion 69.

However, when the cut-out portion 61 is formed at the opening 68 side end portion of the side wall 62 in this way, when the opening 68 is closed by the door 66 such as when the magnetic tape cartridge is not being used (is not inserted in a drive device, or is being stored or transported) or the like, there is the concern that dust and the like may enter in from the gap between the cut-out portion 61 and the engagement portion 69.

SUMMARY OF THE INVENTION

An object of the present invention is to provide a recording tape cartridge in which, when an opening is closed by a shielding member, no gap into which dust or the like can enter is formed between a peripheral edge portion of the opening and the shielding member, so that the dustproof quality of the recording tape cartridge is improved.

In order to achieve the above object, the recording tape cartridge of the present invention comprises: a case which is substantially rectangular, and which rotatably accommodates a single reel on which a recording tape is wound; an opening formed at a corner portion of the case at a side of loading the case into a drive device, the opening being for pulling-out of a leader member attached to an end portion of the recording tape; and a shielding member sliding so as to open and close the opening. A dustproofing wall, which overlaps with a distal end of the shielding member when the shielding member closes the opening, is formed at a peripheral edge portion of the opening.

In accordance therewith, when the shielding member closes the opening, the distal end of the shielding member overlaps with the dustproofing wall which is formed at the peripheral edge portion of the opening. Accordingly, no gap through which dust or the like may enter is formed between the shielding member and the peripheral edge portion of the opening. Accordingly, the dustproof quality at this region can be improved.

DETAILED DESCRIPTION OF THE INVENTION

Hereinafter, a recording tape cartridge 10 relating to an embodiment of the present invention will be described on the basis of the drawings. First, the overall structure of the recording tape cartridge 10 will be briefly described, and then, the main portions relating to the present invention will be described in detail. Note that, for convenience of explanation, the direction of loading the recording tape cartridge 10 into a drive device is denoted by arrow A, and this direction is called the forward direction (front side) of the recording tape cartridge 10. Further, the direction of arrow B, which is orthogonal to arrow A, is the rightward direction.

Figure 1:
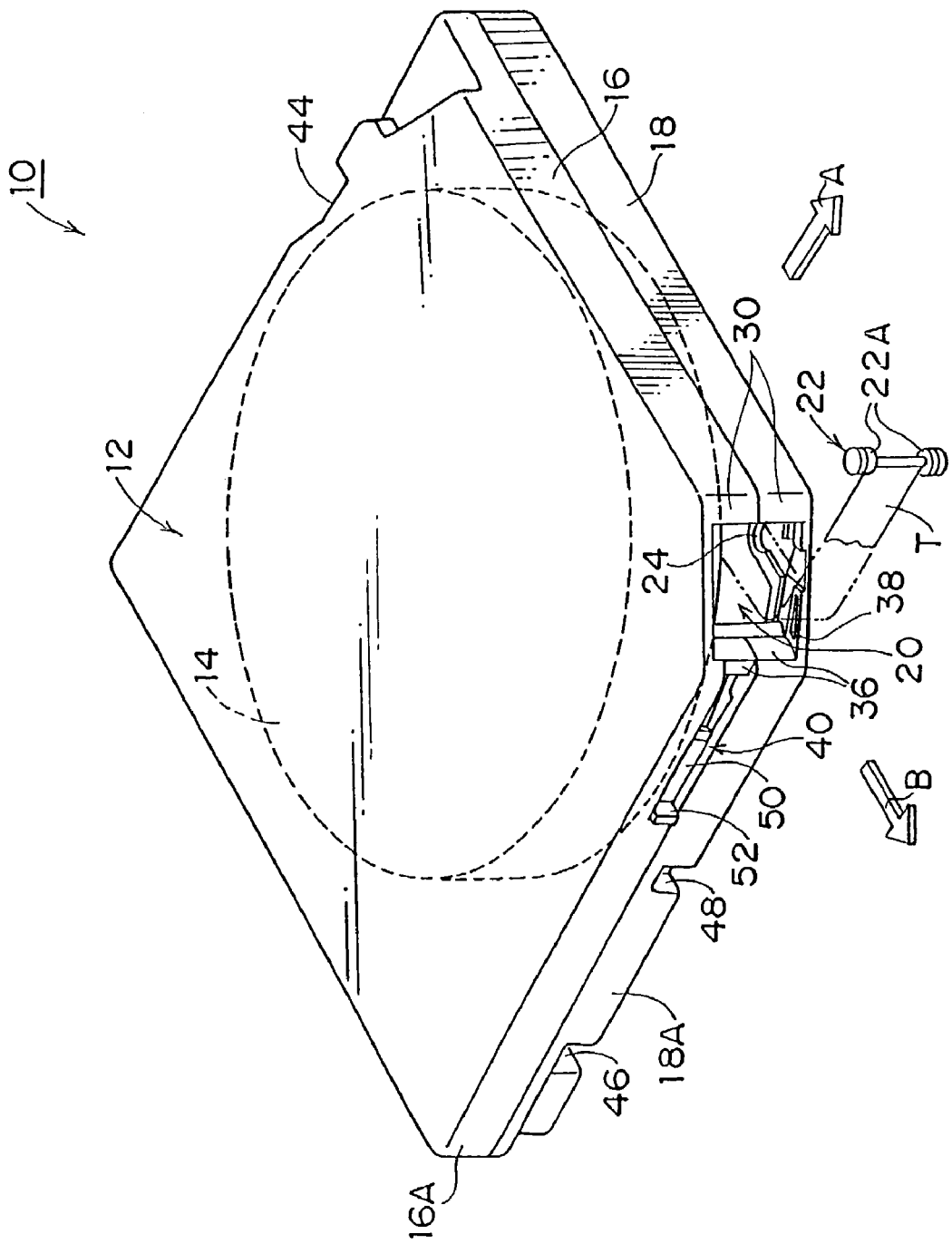
FIG. 1 is a schematic perspective view of a recording tape cartridge.
Figure 2:
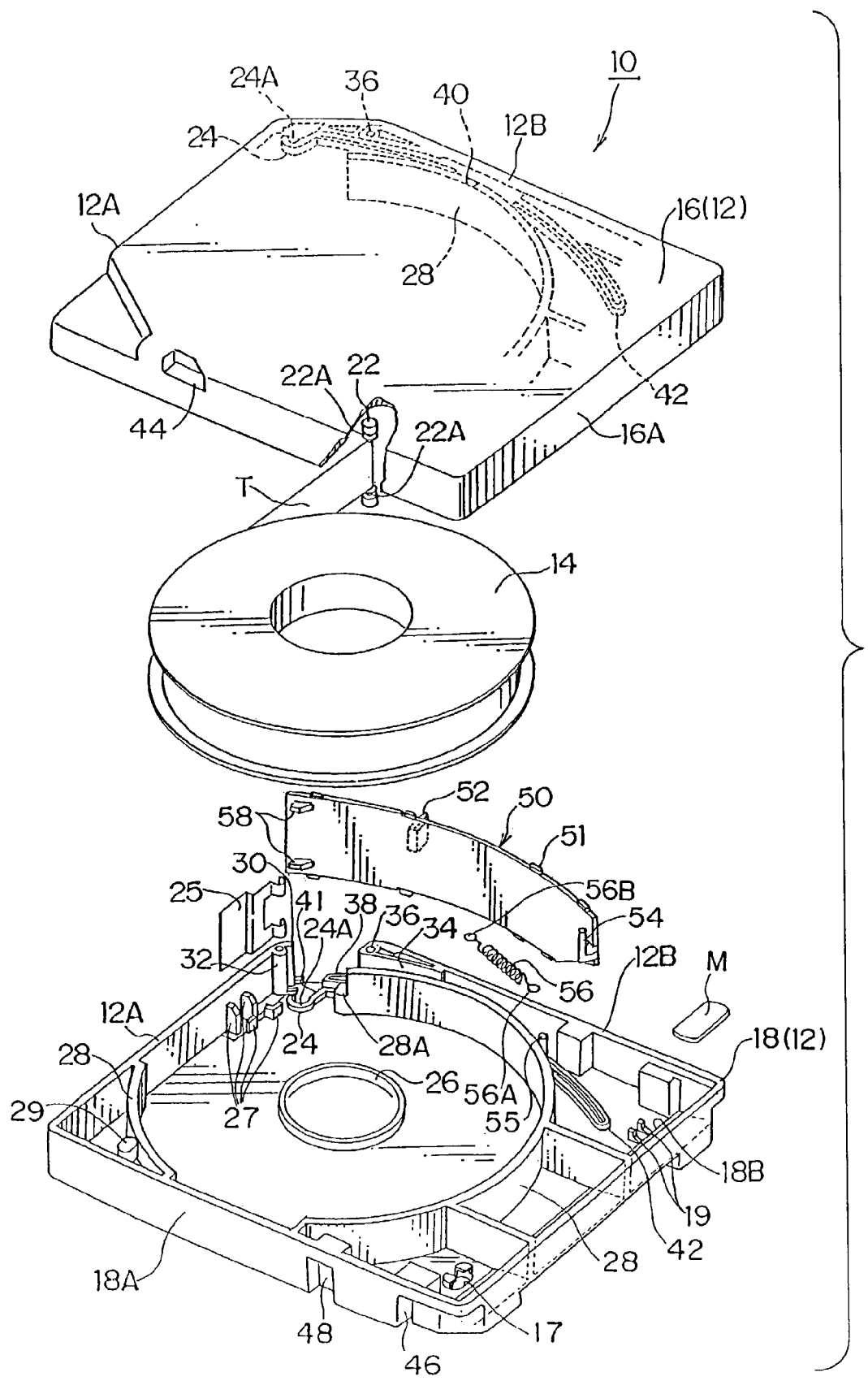
FIG. 2 is a schematic exploded perspective view of the recording tape cartridge.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by peripheral walls 16A and 18A of an upper case 16 and a lower case 18 being set to oppose one another and being joined together. At each of the peripheral walls 16A, 18A, the front right corner portion, which is one corner portion at the leading side in the direction of loading the recording tape cartridge 10 into a drive device, is cut obliquely as seen in plan view. A space for accommodating the reel 14, on which the magnetic tape T is wound, is formed at the interior of the case 12.

The cut corner portions of the peripheral walls 16A, 18A form an opening 20 for the pulling-out of the magnetic tape T. A leader pin 22, which is pulled-out by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. Due to the annular grooves 22A being anchored by hooks or the like of the pull-out means, the hooks or the like do not contact and scratch the magnetic tape T at the time of pulling-out the magnetic tape T.

Figure 3:
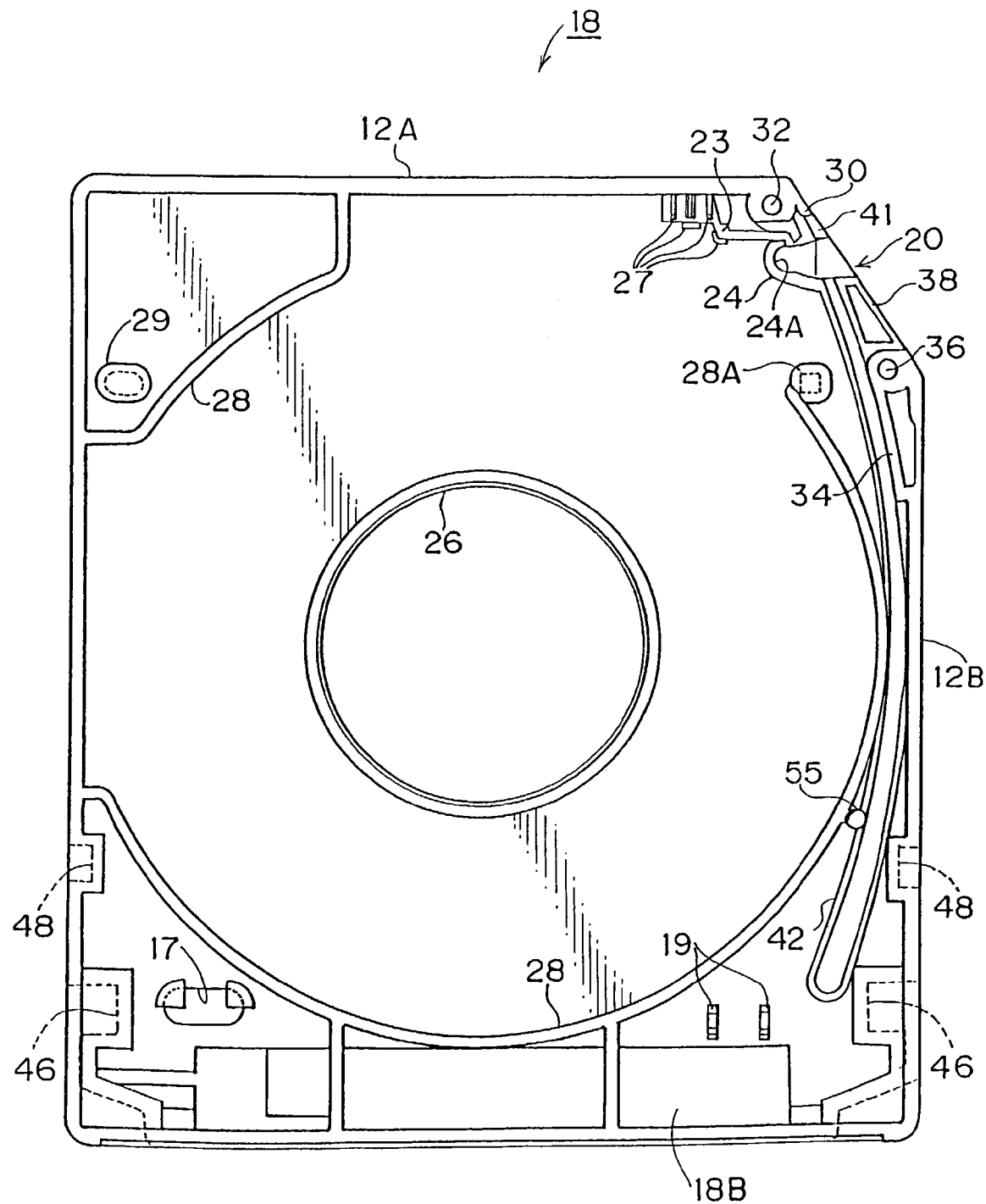
FIG. 3 is a schematic plan view of a lower case.
Figure 4:
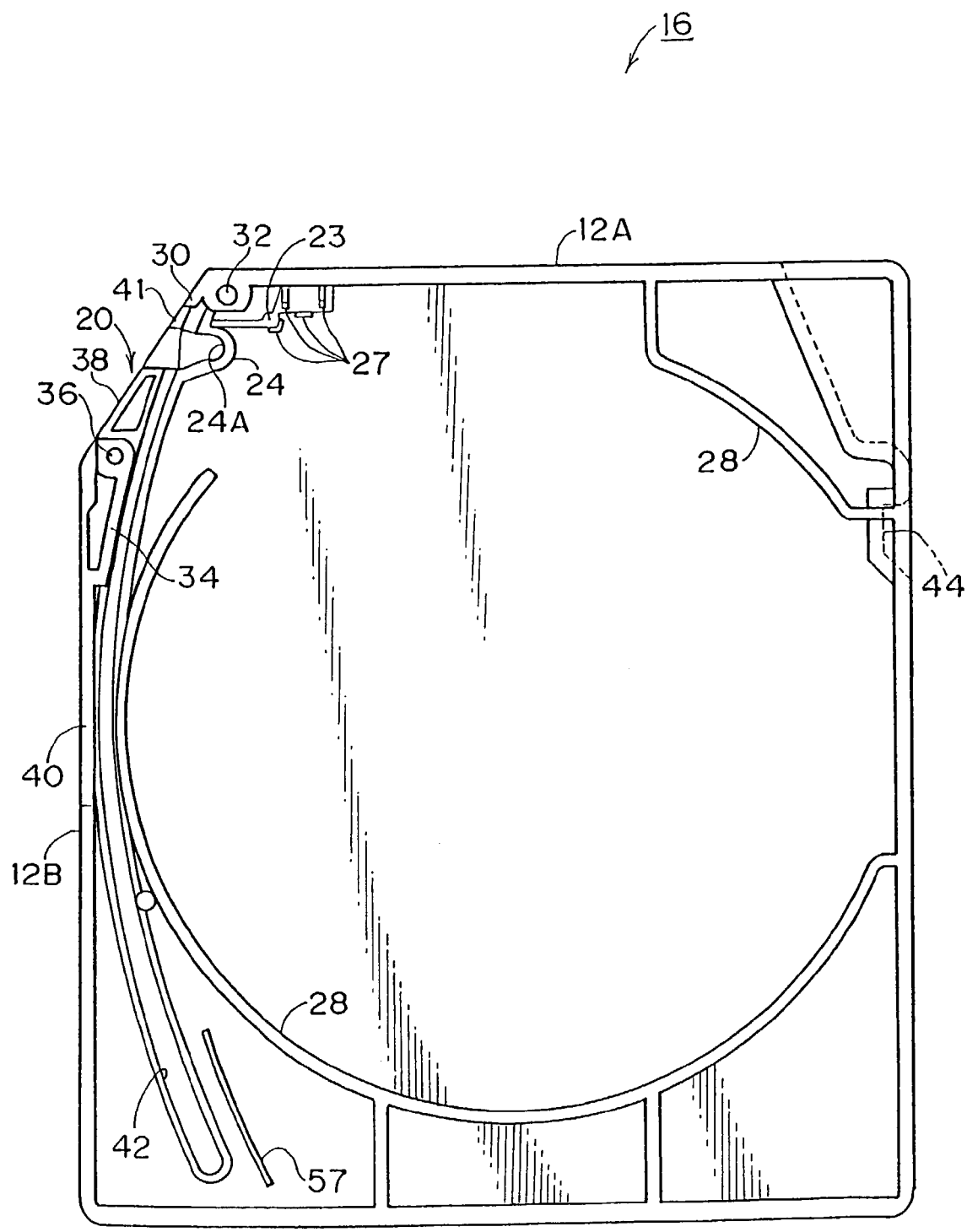
FIG. 4 is a schematic plan view of an upper case.

Next, pin holding portions 24 and plate spring 25 will be described. The pair of upper and lower pin holding portions 24, which position and hold the leader pin 22 at the interior of the case 12, are provided at the inner side of the opening 20 of the case 12. As shown in FIGS. 3 and 4, the pin holding portions 24 are formed in substantially semicylindrical shapes as seen in plan view, such that that magnetic tape T pull-out sides thereof are open. The end portions of the leader pin 22 which is in a state of standing upright can enter into and exit from the pin holding portions 24 from the open sides thereof.

In vicinities of the pin holding portions 24, a proximal portion 25A of the plate spring 25 is inserted and fixed in spring holding portions 27 which are provided at the inner surface of the front wall 12A. (The front wall 12A is the portions of the peripheral walls 16A, 18A where the outer surfaces face in the direction of arrow A.) The distal ends (free ends) of the plate spring 25, which have been divided so as to be forked in two, push the upper and lower ends of the leader pin 22 toward the inner sides of the pin holding portions 24, and thereby hold the leader pin 22 within the pin holding portions 24. When the leader pin 22 enters into and exits from the pin holding portions 24, the operation portion 25C of the plate spring 25 elastically deforms appropriately so as to permit movement of the leader pin 22.

A gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by movement restricting walls 28 which project out at portions of the inner surfaces of the upper case 16 and the lower case 18, and which serve as inner walls which are on a circular locus which is coaxial with the gear opening 26.

An enclosure 28A, in which a hole for position regulation is formed, is provided so as to be continuous with the end portion of the movement restricting wall 28 in a vicinity of the opening 20. Further, an enclosure 28B, in which is formed a hole for position regulation which is a long hole, is provided so as to be continuous with the movement restricting wall 28 at the inner side of the front left corner portion of the case 12. The enclosures 28A, 28B are disposed on a single straight line which extends along the direction of arrow B. The end portions of the movement restricting walls 28, except for the end portions thereof at which the enclosures 28A are continuous, are continuous with the peripheral wall 16A or the peripheral wall 18A of the case 12, so as to partition the outer sides of the movement restricting walls 28 and the space at which the reel 14 is set.

A concave portion 48 is formed at the rear side of the lower case 18. The portion of the concave portion 48, other than the upper end of the peripheral wall 18A, is recessed toward the inner side of the case 12 in a substantially U-shaped configuration as seen in a cross-sectional view, and is recessed upwardly from the bottom surface of the case 12 as well (the bottom plate is cut-out). The concave portion 48 is formed at the left wall of the case 12 as well. The concave portions 48 are engagement portions which, for example, a pull-in mechanism of a drive device engages. The bottom surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in a cross-sectional view, and is recessed upwardly from the bottom surface of the case 12 as well (the bottom plate is cut-out). The concave portions 46 are engagement portions which a grasping device of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of a door 50 (which will be described later) in the direction of opening at the time of opening the opening 20.

A memory board M, which stores various types of information, is set at the rear right portion of the lower case 18 for each recording tape cartridge 10. A rear inner wall 18B is formed at an inclined surface of a predetermined angle and the memory board M is disposed so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 from drive devices) which reads from the rear wall side. An unillustrated write protect tab projects from an opening 17, which is provided at the left rear portion of the lower case 18. The write protect tab is set so that recording onto the recording tape cartridge 10 is possible or is not possible.

Guide wall portions 42, which have certain heights and which support convex portions 51 of the door 50 which will be described later such that the convex portions 51 are nipped from both the inner surface side and the outer surface side, stand erect at the upper case 16 and the lower case 18 from a vicinity of the opening 20 to a vicinity of the rear wall. The guide wall portions 42 have different lengths at the upper case 16 and the lower case 18. The guide wall portion 42 at the upper case 16 is formed such that the rear half side thereof is longer than that of the guide wall portion 42 at the lower case 18. This is because the rear inner wall 18B of the lower case 18 is an inclined surface of a certain angle, and the memory board M is provided at the right wall 12B side thereof.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22. Such positions are about half of the opening width and which are further rearward than pin holding portions 24 in this embodiment. The convex portions 51 which are furthest toward the front at both the top and bottom of the door 50 are restricted such that the door 50 is closed and cannot move any further forward.

There are portions of the guide wall portions 42 extending from or facing the opening 20. At least such portions are made lower than other portions of the guide wall portions 42. This is for obtaining a space at the opening 20 for a pull-out means of a drive device to go through. The pull-out means engages to pull the leader pin 22. In accordance with the lowered portions of the guide wall portions 42, plate width or height of a portion of the door 50 to close the opening 20 is made larger or greater.

Ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as the guide wall portions 42. The strength of the upper case 16 and the lower case 18 at the opening 20 portion is ensured by these ribs 38. Inner guide wall portions 42 are continuos with the pin holding portions 24. Height of the pin holding portions 24 are often made equal to or greater than that of the inner guide wall portions 42.

Next, the door 50 is formed in a substantial arc-shape in plan view which is curved in the direction of the plate thickness, so that the door 50 can move along a certain circumference or the guide wall portion 42. The opening 20 is opened and closed by the door 50 which serves as a closing member. The plate width (height) of at least the portion of the door 50 which closes the opening 20 is substantially the same as the opening height of the opening 20. The plate length of this portion is formed to be sufficiently larger than the opening width of the opening 20. The door 50 closes the opening 20 in a state in which the distal end portion of the door 50 has entered into the concave portions 30A of the inclined wall portions 30. When the door 50 slides (rotates) substantially rearwardly along the aforementioned predetermined circumference so as to open the opening 20, and the outer peripheral surface in the vicinity of the distal end of the door 50 reaches a vicinity of the screw bosses 36, the opening 20 is completely opened. Further, the door 50 closes the opening 20 by sliding (rotating) in the direction opposite to the direction at the time of opening the opening 20. Note that the lower rear portion of the door 50 is notched obliquely in order to avoid the memory board M which is disposed at the inclined surface of the rear inner wall 18B of the lower case 18.

The convex portions 51 project from the top surface and the bottom surface of the door 50. The convex portions 51 abut the guide surfaces of the guide wall portions 42 (the inner side surfaces which oppose each other) and the inner surface of the upper case 16 and the inner surface of the lower case 18 between the guide wall portions 42, and guide the door 50 in the directions of opening and closing the opening 20. The convex portions 51 are for reducing the sliding resistance (friction) between, on the one hand, the door 50, and, on the other hand, the guide surfaces of the guide wall portions 42 and the inner surface of the upper case 16 and the inner surface of the lower case 18 between the guide wall portions 42. The convex portions 51 are formed in substantially oval shapes as seen in plan view which are long along the longitudinal direction of the door 50. Four convex portions 51 project at each of the upper surface and the lower surface of the door 50 so as to have top/bottom symmetry (except for the convex portions 51 furthest toward the rear), and so as to project to substantially the same heights as the heights of the guide wall portions 42. Note that the convex portions 51 furthest toward the rear do not have top/bottom symmetry because the bottom rear portion of the door 50 is cut obliquely.

Distal ends of the convex portions 51, which are substantially arc-shaped or the like as seen in plan view, project at the both side surfaces of the convex portions 51. When the convex portions 51 are inserted between the guide wall portions 42 and slide, the distal ends of the convex portions 51 linearly contact the inner surface of the upper case 16 and the inner surface of the lower case 18. Thus, the sliding resistance (friction) is reduced, and the door 50 can be slid smoothly with little resistance. When the convex portions 51 are formed in substantially oval shapes as seen in plan view, the impact resistance thereof is excellent. Even if force is applied to the door 50 from a direction other than the opening/closing directions due to the impact of a drop or the like, there is no fear that the convex portions 51 will break.

Stoppers 58, which abut the upper end portion side surface and the lower end portion side surface of the leader pin 22 when the opening 20 is closed, project at the inner surface of the front end portion of the door 50. The stoppers 58 can even more reliably prevent the leader pin 22 from falling out from the pin holding portions 24 due to impact at the time the recording tape cartridge 10 is dropped or the like. A coil spring 56, which serves as an urging member which urges the door 50 in the direction of closing the opening 20, is of a length which extends to the right rear corner portion of the case 12 in the state in which the door 50 closes the opening 20. Thus, the space at the right rear corner portion between the play restricting walls 28 and the right wall 12B (the peripheral walls 16A, 18A) can be utilized effectively.

Namely, a spring holding portion 54, which is substantially L-shaped in rear view, is formed so as to be directed upwardly, integrally with the inner peripheral surface of a vicinity of the rear end of the door 50. A solid cylindrical spring anchor portion 55 projects upwardly at the inner surface of the lower case 18 in a vicinity of the concave portion 48. Ring-shaped attachment portions 56A, 56B are formed at the both ends of the coil spring 56. Accordingly, the coil spring 56 can be easily attached within the aforementioned space by the one attachment portion 56B being placed on the spring anchor portion 55 from above such that the spring anchor portion 55 is inserted through the attachment, portion 56B, and the other attachment portion 56A being placed on the spring holding portion 54 from above such that the spring holding portion 54 is inserted through the attachment portion 56A.

A rib 57, along which the top portion of the spring holding portion 54 slides at the time of opening and closing the door 50, stands erect in a substantial arc-shape in plan view at the upper case 16. The rib 57 is disposed at a position and has a length such that the spring holding portion 54 can slide within the rib 57 at least when the door 50 starts to move (open). Due to the rib 57 suitably guiding the spring holding portion 54 which moves against the urging force of the coil spring 56, the door 50 can be opened more stably (the door 50 does not shake due to the urging force of the coil spring 56 at the time of opening).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that, the top end of the spring anchor portion 55 as well is inserted between the play restricting wall 28 and the guide wall portion 42 of the upper case 16. Thus, in the same way, the attachment portion 56B can be prevented from coming off of the spring anchor portion 55. The operation projection 52, which serves as an operation portion, projects along the radial direction of the door 50 at the outer peripheral surface, slightly further toward the front than the longitudinal direction central portion of the door 50. The operation projection 52 is exposed to the exterior of the case 12 from the slit 40, and is positioned so as to be set apart slightly from the rear ends of the screw bosses 36 when the opening 20 is in a closed state, and can be operated from the portion of the slit 40 which opens toward the front. The slit 40 is formed by cutting out a predetermined length of the lower portion of the front side of the peripheral wall 16A of the upper case 16 forming the right wall 12B, and opens toward the opening 20 as well.

Accordingly, the operation projection 52 can be operated from the portion of the slit 40 which is open toward the front. In the state in which the opening 20 is open, the operation projection 52 is positioned so as to be set apart slightly from the rear edge of the slit 40. At this time, the convex portions 51 which are positioned the furthest rearward abut the rear end portions of the guide wall portions 42. Further, the interior and exterior of the case 12 communicate through the slit 40 for exposing the operation projection 52. However, the adhesion of dust and the like to the magnetic tape T wound on the reel 14 is prevented by the play restricting walls 28 which serve as inner walls, and by the slit 40 always being substantially closed by the door 50 which extends over substantially the entire height of the interior of the case 12.

Figure 5:
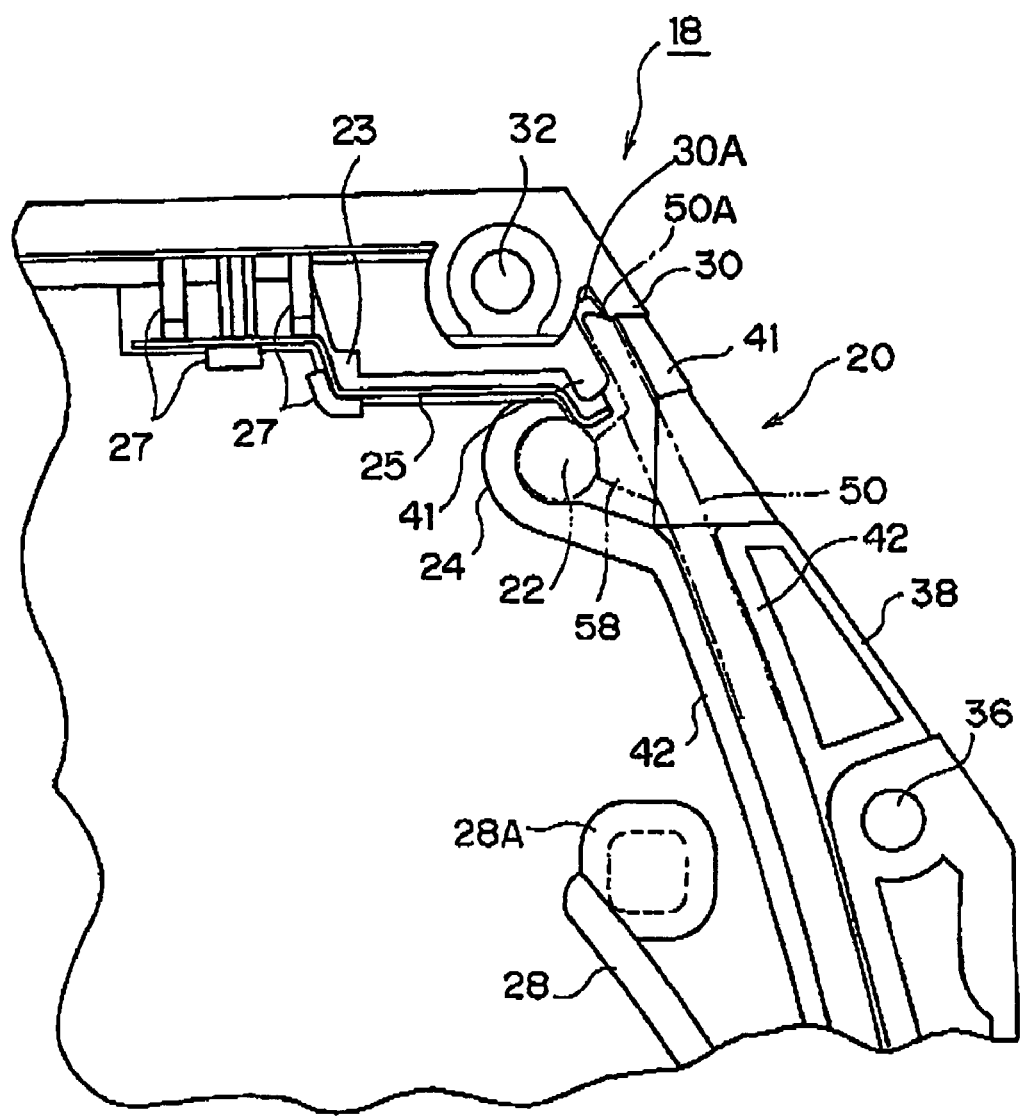
FIG. 5 is a schematic enlarged plan view showing a vicinity of an opening of the lower case.
Figure 6:
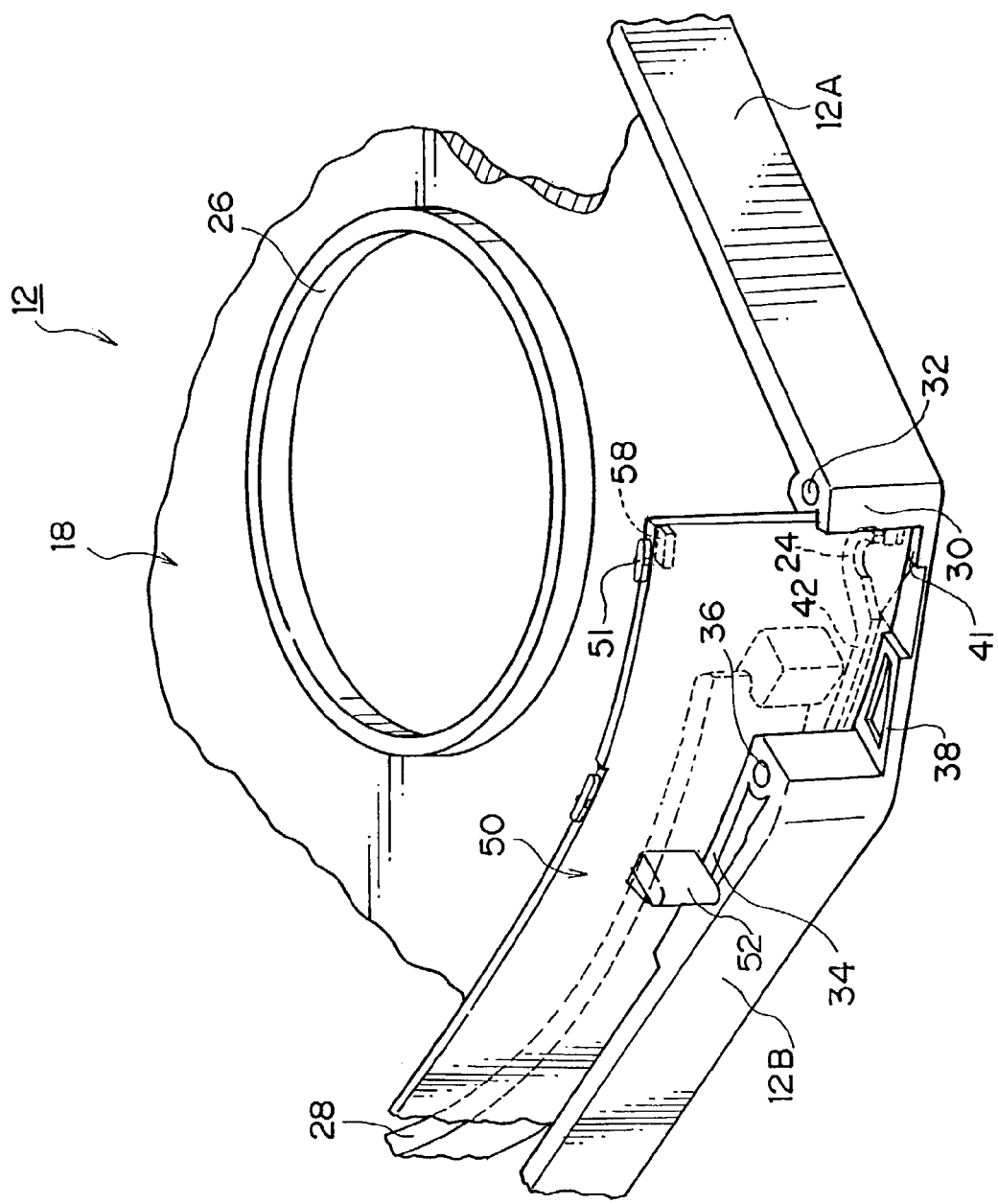
FIG. 6 is a schematic enlarged perspective view showing the vicinity of the opening of the lower case.
Figure 7:
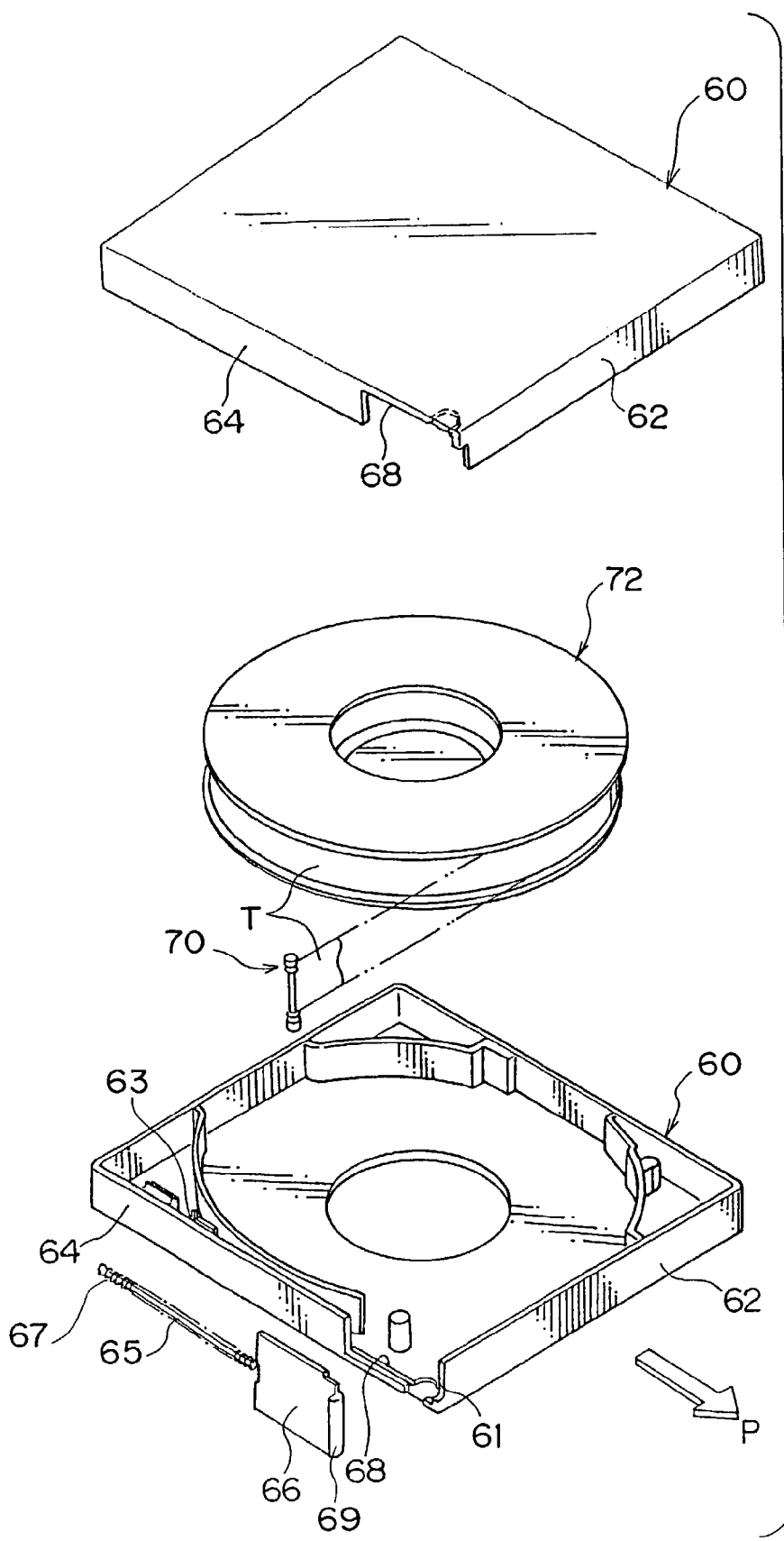
FIG. 7 is a schematic exploded perspective view of a conventional magnetic tape cartridge having a leader pin.

Next, the structure of the vicinity of the opening relating to the present invention in the recording tape cartridge 10 will be described in detail. As shown in FIGS. 5 and 6, a pair of upper and lower inclined wall portions 30, which are short and which prescribe the front edge portion of the opening 20, are provided integrally with the right end portion of the front wall 12A of the case 12. The inclined wall portions 30 are formed to be bent along the plane of opening of the opening 20. A pair of upper and lower screw bosses 32 are continuous with the inner side of the front wall 12A in a vicinity of the left side of the inclined wall portions 30.

Guide wall portions 41, which are short and which are positioned on the same circumference as the guide wall portions 42, stand erect at the inner sides of and on imaginary lines extending from the inclined wall portions 30. The interval between the guide wall portions 41 is formed so as to be slightly more narrow than the interval between the guide wall portions 42. Due to the convex portions 51 of the door 50 entering in between the guide wall portions 41 when the opening 20 is closed, the door 50 can be held without joggling. The rear end portions of the guide wall portions 41 are of course open, and do not extend further rearward than the front ends of the pin holding portions 24 so as to not impede the entry and exit of the leader pin 22.

When the front end portion (distal end portion) of the door 50 enters in between the guide wall portions 41, the front end portion of the door 50 is positioned at the inner sides of the inclined wall portions 30, and the inclined wall portions 30 and the front end portion of the door 50 overlap (the outer surface of the front end portion of the door 50 is covered by the inner surfaces of the inclined wall portions 30, either in a contacting state or a state of non-contact), and a labyrinth structure is formed. Thus, when the opening 20 is closed, dust and the like can be reliably prevented from entering into the case 12 from a gap between the peripheral edge portion of the opening 20 (the rear end portions of the inclined wall portions 30) and the door 50. Note that it is preferable to form the inner surface and/or the outer surface of the front end portion (distal end portion) of the door 50 which enters in between the guide wall portions 41 as a tapered surface, for smooth entry in between the guide wall portions 41. In this case, the outer surface is a taper surface 50A (see FIG. 5).

A pair of upper and lower inclined wall portions 34, which are shaped, in plan view, so as to substantially run along the outer peripheral surface of the door 50, are provided at the inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

The upper case 16 and the lower case 18 are fixed (joined) together by unillustrated screws being screwed, from beneath, into the screw bosses 32, 36 positioned in a vicinity of the peripheral edge portion of the opening 20. In this way, the corner portions at the both ends of the opening 20, which are prescribed by the free ends of inclined wall portions 30 (the front wall 12A) and the inclined wall portions 34 (the right wall 12B) and which are disadvantageous in terms of strength and easily impact the ground or the like due to the case 12 being dropped, are connected together strongly. Even if the case 12 is dropped, the opening 20 portion does not deform or buckle and positional offset does not arise threat, due to the entire weight of the recording tape cartridge 10. It goes without saying that this fastening together by screws is preferable in terms of both the ability to disassemble the case 12 and the ability to recycle the case 12. Further, the strength around the opening 20 is further improved by the inclined wall portions 30 which extend from the screw bosses 32. Thus, plastic deformation and breakage caused by the impact of a drop can be suppressed.

Next, operation at the above-described recording tape cartridge 10 will be described. When the recording tape cartridge 10 is not being used (i.e., is being stored, or being transported), the opening 20 is closed by the door 50. Specifically, due to the urging force of the coil spring 56, the distal end portion (front end portion) of the door 50 enters into the concave portions 30A of the inclined wall portions 30, and the outer peripheral surface of the intermediate portion of the door 50 substantially contacts the inner surfaces of the inclined wall portions 34, and the door 50 closes the opening 20.

When the magnetic tape T is to be used, the recording tape cartridge 10 is loaded into a drive device along the direction of arrow A. Accompanying this loading, an opening/closing member (not illustrated) provided at the drive device enters into the slit 40 which opens toward the front, and engages with the operation projection 52 of the door 50. In this state, when the recording tape cartridge 10 (the case 12) is pushed in further, due to the pushing-in force, the opening/closing member moves the operation projection 52 rearward against the urging force of the coil spring 56. Or, it can be said that the operation projection 52 is moved rearward relative to the case 12 which is loaded in the direction of arrow A.

Then, while the convex portions 51 are guided by the guide wall portions 42, the door 50, from which the operation projection 52 projects out, rotates clockwise as seen in plan view along the direction of curving thereof. Namely, due to the guide wall portions 42, the door 50 does not jut out from the locus of movement along the curved configuration thereof, but rather moves substantially rearward so as to circle around the outer side of the pin holding portions 24 and the reel 14, and opens the opening 20. Then, when the case 12 (the recording tape cartridge 10) is loaded to a predetermined depth in the drive device, the opening 20 is completely opened.

In this state, when the recording tape cartridge 10 is positioned within the drive device, further rotation (substantially rearward movement) of the door 50 is restricted. The pull-out means of the drive device enters into the case 12 from the opening 20 which has been opened. The pull-out means pulls-out the leader pin 22 which is positioned and held at the pin holding portions 24. The leader pin 22, which has been removed from the pin holding portions 24, is accommodated at the take-up reel (not shown) of the drive device. Due to the take-up reel and the reel 14 being driven to rotate synchronously, the magnetic tape T is successively pulled-out from the case 12 while being taken-up onto the take-up reel. Information is recorded or played back by a recording/playback head or the like disposed along the predetermined tape path.

When the magnetic tape T is rewound onto the reel 14 and the recording tape cartridge 10 is to be ejected from the drive device, the positioned state of the recording tape cartridge 10 is released. The recording tape cartridge 10 is moved in the direction opposite to the direction of arrow A by the urging force of the coil spring 56 or by an unillustrated ejecting mechanism. Then, while the convex portions 51 of the door 50 are guided by the guide wall portions 42, the door 50 is rotated in the direction of closing the opening 20 by the urging force of the coil spring 56. Due to the distal end portion of the door 50 entering into the inner side of the guide wall portions 41 and positioning interior of the inclined wall portions 30, the opening 20 is completely closed. This closed state is the initial state of the cartridge 10 as well.

Here, as described above, the opening 20 is closed in a state in which the front end portion (distal end portion) of the door 50 has entered in at the inner sides of the inclined wall portions 30 (i.e., in a state in which the front end portion (distal end portion) of the door 50 overlaps with the inclined wall portions 30). Accordingly, at this time, a gap through which dust or the like could enter does not exist between the door 50 and the rear edge portions of the inclined wall portions 30 forming the opening 20, and the entry of dust and the like is reliably prevented. Accordingly, the dustproof quality in a vicinity of the opening 20 of the case 12 can be strengthened (improved). Moreover, by providing the inclined wall portions 30, the strength around the opening 20 can be improved. Thus, plastic deformation and breakage caused by the impact of a drop can be suppressed.

The opening 20 is formed by cutting off a loading side corner portion (the front right corner portion) of the rectangular case 12, and the plane of opening of the opening 20 is directed in the direction of arrow A and the direction of arrow B (the plane of opening is inclined with respect to the direction of arrow A). Accordingly, the pull-out mechanism (hooks or the like) of the drive device can access and engage the leader pin 22 from the direction of arrow A, from the direction of arrow B, or from between the direction of arrow A and the direction of arrow B. A direction (the direction of arrow A) which makes the path for pulling out the magnetic tape T to be the shortest can be selected.

Namely, the region over which leader pin 22 can be engaged is broad. Thus, the area in which the pin holding portions 24 can be set is broad. The positions at which the pin holding portions 24 are disposed can be set in accordance with the specifications of the drive device which engages the leader pin 22 from the direction of arrow A. Therefore, the degrees of freedom in designing the drive device and the recording tape cartridge 10 are increased.

Further, the door 50 is curved in an arc-shape, and the locus of movement thereof is a curved configuration corresponding to a predetermined circumference which runs substantially along the outer peripheral portion of the reel 14. Thus, the space within the case 12 can be utilized efficiently, and the opening 20 can be made to be larger. Namely, the center of rotation of the door 50 which opens and closes the opening 20 can be determined independently of the axially central position of the reel 14. Thus, the angle of inclination of the plane of opening of the opening 20 with respect to the direction of arrow A, the size of the opening 20 (the distance between the inclined wall portions 30 and the screw bosses 36 which are the front and back peripheral edge portions), and the like can be set arbitrarily. It is possible to obtain the opening 20 of an arbitrary configuration and arbitrary dimensions corresponding to the requirements of drive devices and the like.

As described above, in accordance with the present invention, when a shielding member closes an opening, the distal end of the shielding member overlaps with a dustproofing wall formed at the peripheral edge portion of the opening. Thus, a gap through which dust and the like can enter is not formed between the shielding member and the peripheral edge portion of the opening. Accordingly, the dustproof quality at this region can be improved.

What is claimed is:

1. A recording tape cartridge comprising:
   a case which is substantially rectangular, and which rotatably accommodates a single reel on which a recording tape is wound;
   a portion having an opening formed at a corner portion of the case at a side of loading the case into a drive device, the opening being for pulling-out of a leader member attached to an end portion of the recording tape;
   a shielding member sliding so as to open and close the opening; and
   a dustproofing wall formed at a peripheral edge portion of the opening, and when the shielding member closes the opening, the dustproofing wall overlaps with the full width of a distal end of the shielding member so that the distal end of the shielding member is positioned at the inner side of the dustproofing wall;
   wherein said corner portion is provided between peripheral walls of the case, and said corner portion is cut obliquely with respect to said peripheral walls;
   wherein the shielding member is a door which is arc-shaped in plan view, and which curves along a direction of a thickness of the shielding member so as to be movable along a given circumference.

2. A recording tape cartridge comprising:
   a case which is substantially rectangular, and which rotatably accommodates a single reel on which a recording tape is wound;
   a portion having an opening formed at a corner portion of the case at a side of loading the case into a drive device, the opening being for pulling-out of a leader member attached to an end portion of the recording tape;

a shielding member sliding so as to open and close the opening; and a dustproofing wall formed at a peripheral edge portion of the opening, and when the shielding member closes the opening, the dustproofing wall overlaps with the full width of a distal end of the shielding member so that the distal end of the shielding member is positioned at the inner side of the dustproofing wall, wherein the shielding member is a door which is arc-shaped in plan view, and which curves along a direction of a thickness of the shielding member so as to be movable along a given circumference.

3. A recording tape cartridge comprising:

a case which is substantially rectangular, and which rotatably accommodates a single reel on which a recording tape is wound;

a portion having an opening formed at a corner portion of the case at a side of loading the case into a drive device, the opening being for pulling-out of a leader member attached to an end portion of the recording tape;

a shielding member sliding so as to open and close the opening; and a dustproofing wall formed at a peripheral edge portion of the opening, and when the shielding member closes the opening, the dustproofing wall overlaps with the full width of a distal end of the shielding member so that the distal end of the shielding member is positioned at the inner side of the dustproofing wall, wherein the dustproofing wall is a pair of upper and lower inclined wall portions which are provided integrally with a right end portion of a front wall of the case and which prescribe a front edge portion of the opening.

4. The recording tape cartridge of claim 3, wherein the inclined wall portions are bent along a plane of opening of the opening.

5. The recording tape cartridge of claim 3, wherein first guide wall portions, which are positioned on a given circumference, stand upright at an inner side of the inclined wall portions and on an imaginary line extending from the inclined wall portions.

6. The recording tape cartridge of claim 5, wherein the case has an upper case and a lower case, and second guide wall portions, which are of a given height and which support a portion of the shielding member such that the portion of the shielding member is nipped from both an inner surface side and an outer surface side, stand erect at each of the upper case and the lower case from a vicinity of the opening to a vicinity of a rear wall of the case.

7. The recording tape cartridge of claim 6, wherein the first guide wall portions and the second guide wall portions are positioned on a same circumference, and an interval between the first guide wall portions is slightly narrower than an interval between the second guide wall portions, and the portion of the shielding member can fit in between the first guide wall portions.

8. The recording tape cartridge of claim 6, wherein at least one pair of convex portions projects at an upper surface and a lower surface of the shielding member, and the convex portions abut mutually opposing inner surfaces of the second guide wall portions and an inner surface of the lower case between the second guide wall portions and an inner surface of the upper case between the second guide wall portions, and the shielding member can be guided in directions of opening and closing the opening.

9. The recording tape cartridge of claim 8, wherein the convex portions are oval in plan view, and are long along a longitudinal direction of the shielding member.

10. The recording tape cartridge of claim 8, wherein a plurality of pairs of convex portions are provided along a longitudinal direction of the shielding member, and the pairs are disposed so as to have top-bottom symmetry, except for one pair of the convex portions which is nearest to an end portion of the shielding member.

11. The recording tape cartridge of claim 8, wherein a distal end of each convex portion is arc-shaped in sectional view, and the distal end of the convex portion can linearly contact the inner surface of the upper case and the inner surface of the lower case.

12. A recording tape cartridge comprising:

a case which is substantially rectangular, and which rotatably accommodates a single reel on which a recording tape is wound;

a portion having an opening formed at a corner portion of the case at a side of loading the case into a drive device, the opening being for pulling-out of a leader member attached to an end portion of the recording tape;

a shielding member sliding so as to open and close the opening; and a dustproofing wall formed at a peripheral edge portion of the opening, and when the shielding member closes the opening, the dustproofing wall overlaps with the full width of a distal end of the shielding member so that the distal end of the shielding member is positioned at the inner side of the dustproofing wall;

wherein said corner portion is provided between peripheral walls of the case, and said corner portion is cut obliquely with respect to said peripheral walls, wherein the dustproofing wall is a pair of upper and lower inclined wall portions which are provided integrally with a right end portion of a front wall of the case and which prescribe a front edge portion of the opening.

13. The recording tape cartridge of claim 12, wherein the inclined wall portions are bent along a plane of opening of the opening.

14. The recording tape cartridge of claim 12, wherein first guide wall portions, which are positioned on a given circumference, stand upright at an inner side of the inclined wall portions and on an imaginary line extending from the inclined wall portions.

15. The recording tape cartridge of claim 14, wherein the case has an upper case and a lower case, and second guide wall portions, which are of a given height and which support a portion of the shielding member such that the portion of the shielding member is nipped from both an inner surface side and an outer surface side, stand erect at each of the upper case and the lower case from a vicinity of the opening to a vicinity of a rear wall of the case.

16. The recording tape cartridge of claim 15, wherein the first guide wall portions and the second guide wall portions are positioned on a same circumference, and an interval between the first guide wall portions is slightly narrower than an interval between the second guide wall portions, and the portion of the shielding member can fit in between the first guide wall portions.

17. The recording tape cartridge of claim 15, wherein at least one pair of convex portions projects at an upper surface and a lower surface of the shielding member, and the convex portions abut mutually opposing inner surfaces of the second guide wall portions and an inner surface of the lower case between the second guide wall portions and an inner surface of the upper case between the second guide wall portions, and the shielding member can be guided in directions of opening and closing the opening.

18. The recording tape cartridge of claim 17, wherein the convex portions are oval in plan view, and are long along a longitudinal direction of the shielding member.

19. The recording tape cartridge of claim 17, wherein a plurality of pairs of convex portions are provided along a longitudinal direction of the shielding member, and the pairs are disposed so as to have top-bottom symmetry, except for one pair of the convex portions which is nearest to an end portion of the shielding member.

20. The recording tape cartridge of claim 17, wherein a distal end of each convex portion is arc-shaped in sectional view, and the distal end of the convex portion can linearly contact the inner surface of the upper case and the inner surface of the lower case.

* * * * *